United States Patent [19]

Kolm

[11] 4,057,602
[45] Nov. 8, 1977

[54] VENTURI SCRUBBER

[76] Inventor: Ernest L. Kolm, 419 W. Cambridge, Alliance, Ohio 44601

[21] Appl. No.: 474,701

[22] Filed: May 30, 1974

Related U.S. Application Data

[63] Continuation of Ser. No. 233,091, March 9, 1972, abandoned.

[51] Int. Cl.² ............................................. B01D 47/10
[52] U.S. Cl. ......................................... 261/63; 55/224; 55/226; 261/116; 261/DIG. 9; 261/DIG. 54
[58] Field of Search ......................... 261/17, 18, 30, 63, 261/116, DIG. 54, 118, DIG. 9; 55/224, 226

[56] References Cited

U.S. PATENT DOCUMENTS

| | | | |
|---|---|---|---|
| 1,929,234 | 10/1933 | Anderson | 261/63 X |
| 3,112,352 | 11/1963 | Krantz | 261/DIG. 54 |
| 3,138,441 | 6/1964 | Krantz | 261/118 X |
| 3,331,591 | 7/1967 | Dell'Agnese et al. | 261/DIG. 54 |
| 3,336,733 | 8/1967 | Wisting | 261/DIG. 54 |
| 3,490,204 | 1/1970 | Kalika | 261/DIG. 54 |
| 3,502,308 | 3/1970 | Simizu | 261/116 X |

Primary Examiner—Tim R. Miles
Assistant Examiner—Richard L. Chiesa
Attorney, Agent, or Firm—Oldham & Oldham Co.

[57] ABSTRACT

An improved venturi scrubber for removing particulate matter from a gas stream. The scrubber includes ports located either at the throat at the venturi or in the divergent section for injecting gas or air into the stream being processed through the scrubber. The ports may be either a series of openings or a continuous annular opening and are connected by ducting either to the convergent section of the scrubber to receive a portion of the incoming gas stream or to a separate source of gas or air.

17 Claims, 9 Drawing Figures

VENTURI SCRUBBER

This is a continuation of application Ser. No. 233,091, filed Mar. 9, 1972 now abandoned.

Venturi scrubbers are widely used to process gases which have entrained particulate matter to effect the removal of such matter therefrom. Increasing awareness of the harmful effects of air pollution, especially in industrial areas, and the increasing stringent anti-pollution requirements which are being imposed to combat such pollution emphasize the great importance of developing efficient dust removing apparatus. The dust laden gases produced from basic oxygen steel processing furnaces, blast furnaces, lime kilns, and the like are examples of the gases which must be subjected to scrubbing or cleaning action before being discharged into the atmosphere. Venturi scrubbers in which the gas stream is caused to flow through a constricted venturi passage while water or other liquid is injected into the stream are widely used and relatively efficient means for cleaning such dust laden gases.

It is the primary object of the present invention to provide a venturi scrubber which operates in a more efficient manner than those of the prior art.

It is also an object of the present invention to provide a venturi scrubber in which the effective mass transfer of the scrubber is substantially increased by provision of means to form more suspended liquid particles in the gas stream in the divergent section of the scrubber.

It is also an object of the present invention to provide a venturi scrubber which includes means for injecting a gas or air into the processed stream as the stream leaves the throat portion of the scrubber to increase the mixing action between the gas and the injected liquid to more efficiently and thoroughly clean the gas stream.

It is a further object of the present invention to provide a venturi scrubber in which a portion of the incoming gas stream may be controllably diverted around the venturi throat and subsequently reinjected into the main stream to promote more efficient mixing of the gas and liquid.

The above and other objects of the invention which will become apparent in the following detailed description are achieved by providing a venturi scrubber which consists, essentially, of a venturi having a convergent section, a throat section, and a diverging section, liquid injecting means located prior to or in the throat section, and means for injecting gas into the stream passing through the throat. The injected gas may be either a portion of the incoming stream or gas from a separate source and the injection is accomplished either at the exit side of the throat or in the adjacent region of the diverging section of the scrubber.

For a more complete understanding of the invention and the objects and advantages thereof reference should be had to the following detailed description and accompanying drawings wherein there is shown a preferred embodiment of the invention.

Figure 5:
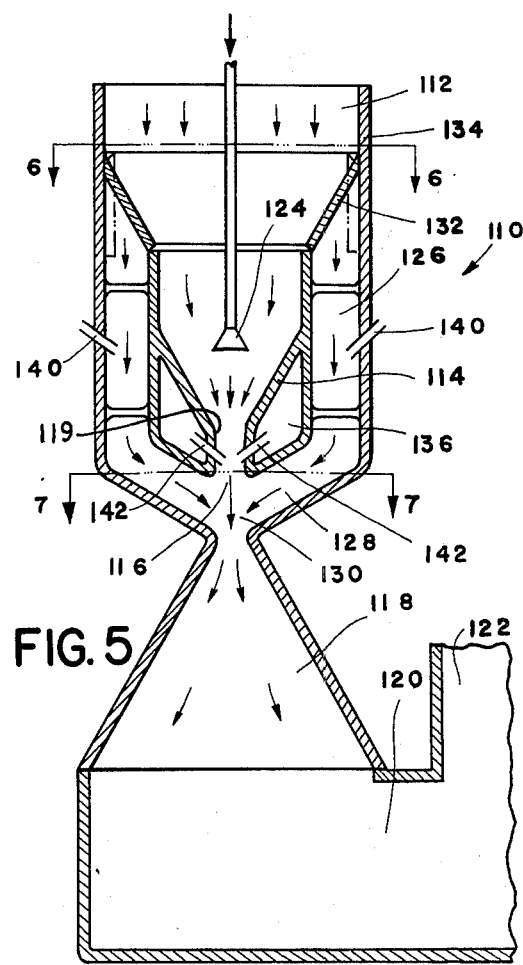
FIG. 5 is a vertical sectional view of a second embodiment of the venturi scrubber of the present invention.
Figure 6:
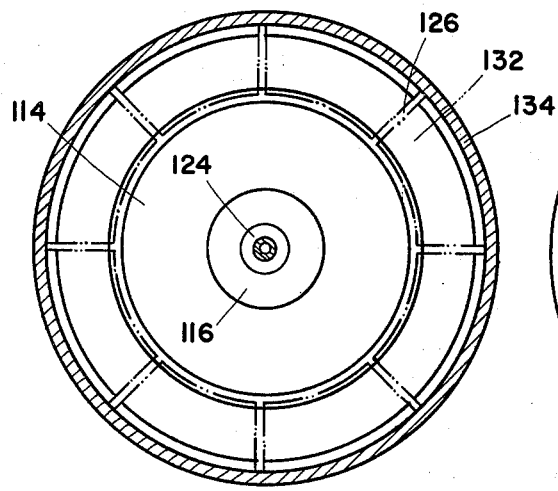
Figure 7:
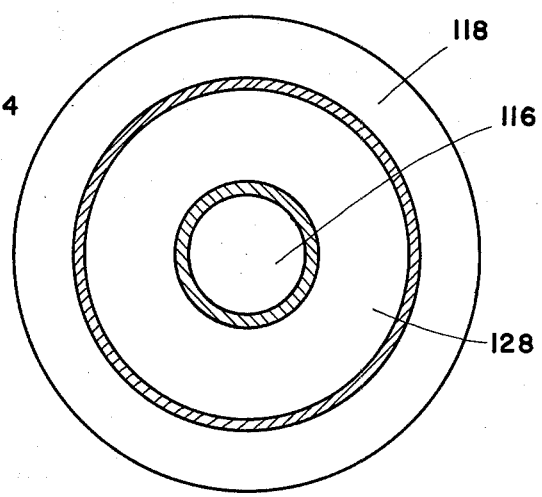
Figure 8:
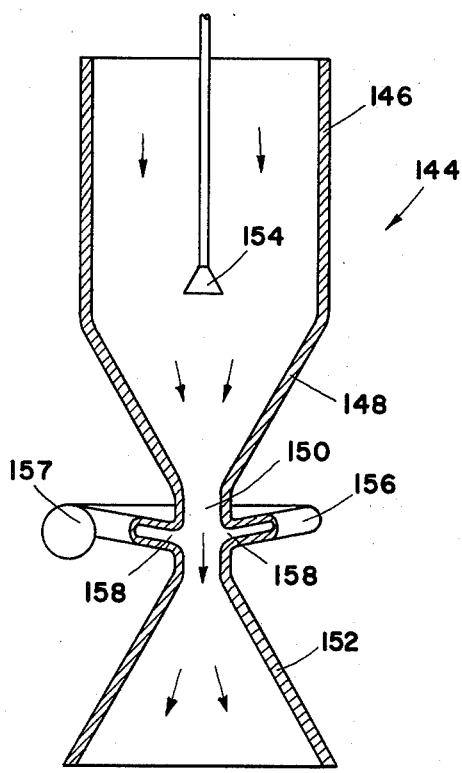
Figure 9:
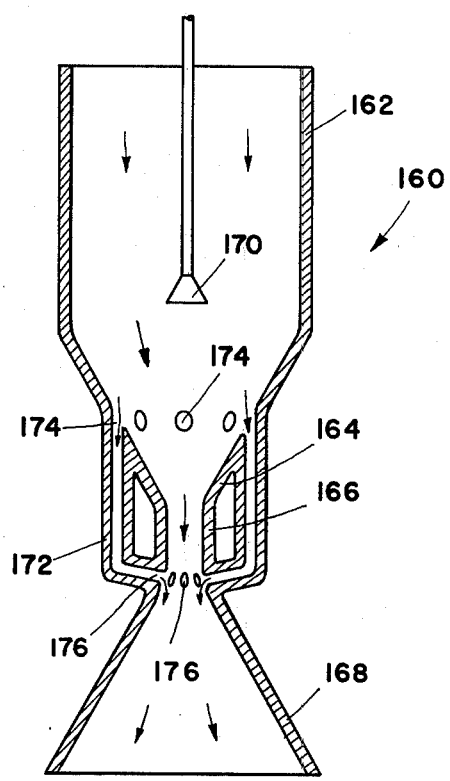

FIGS. 6 and 7 are transverse sectional views taken along the lines 6—6 and 7—7, respectively, of FIG. 5;

FIG. 8 is a vertical sectional view of a third embodiment of the venturi scrubber of the present invention; and FIG. 9 is a vertical view of a further modification of the invention.

The reference numeral 10 indicates generally a gas scrubbing installation which employs the improved venturi scrubber of the present invention. In the assembly 10 incoming gases are directed by a suitable duct 12 to the venturi scrubber 14. The incoming gases contain particulate material which must be removed from the gases before they are discharged. As will be discussed in greater detail below, as the gases pass through the venturi scrubber 14 a liquid is injected into the gas stream which, in the turbulent lower region of the venturi, forms fine droplets which adhere to the particulate matter in the gas. From the venturi scrubber 14 the gases pass into a collection chamber 16 supported on a suitable base 18. The liquid droplets and the particulate matter adhering thereto collect in the lower region of the collecting chamber 16 while the now cleaned gases pass through a discharge duct 20.

The liquid is injected into the venturi by means of a nozzle 22 which is connected by suitable piping 24 to a pump 26 driven by a motor 28. Preferably, the lower end 30 of the collection chamber 16 is funnel shaped and connected to an outlet pipe 32 which provides an inlet for the pump 34 so that the liquid which collects in the chamber 16 may be recirculated by the pump 36 to the nozzle 22. Valves 36, 38, 38a, and 42 may be provided in the piping lines to permit the liquor to be recirculated or to be discharged and additional water or other liquid injected into the incoming gas stream, as desired. A pressure meter may be provided in the pipeline 24.

Figure 1:
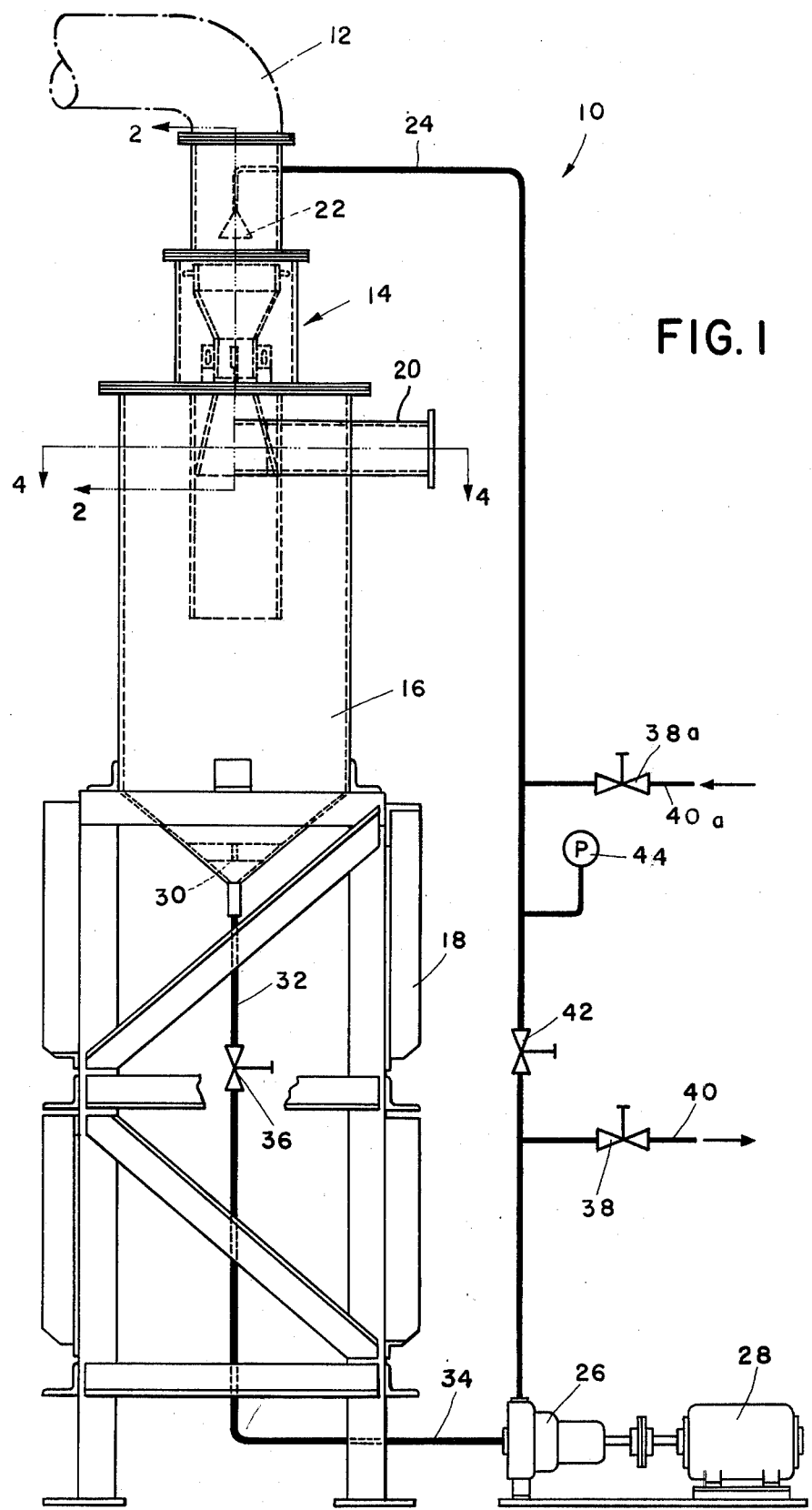
FIG. 1 is a side elevational view of the preferred embodiment of the venturi scrubber of the present invention.
Figure 2:
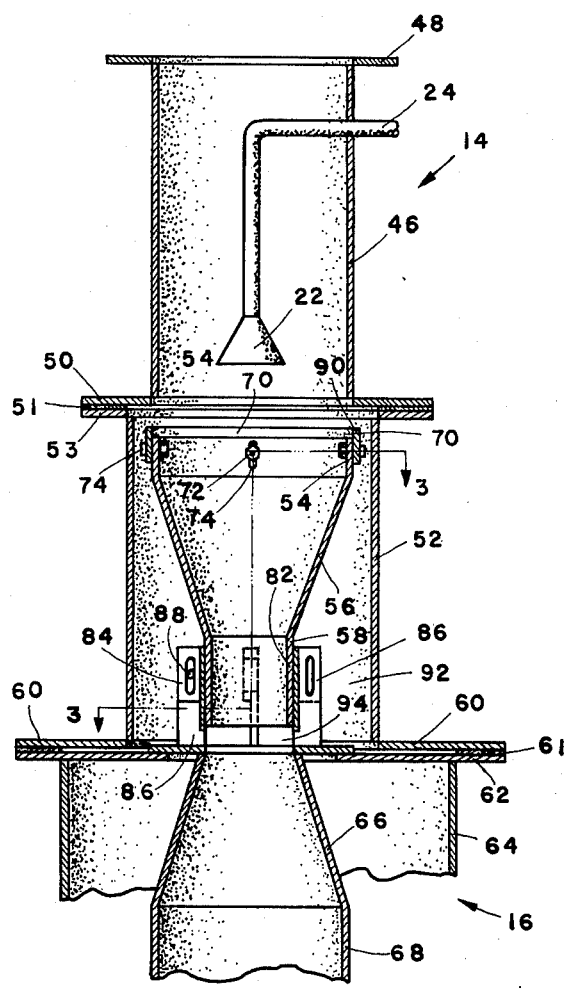
FIG. 2 is a vertical sectional view taken along the line 2—2 of FIG. 1.
Figure 3:
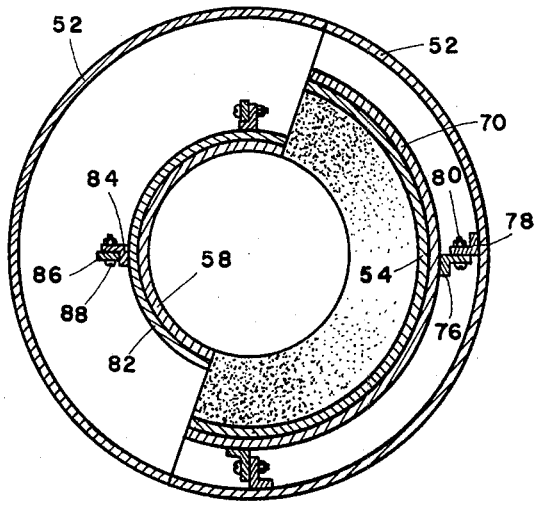
FIG. 3 is a transverse sectional view taken along the line 3—3 of FIG. 2.
Figure 4:
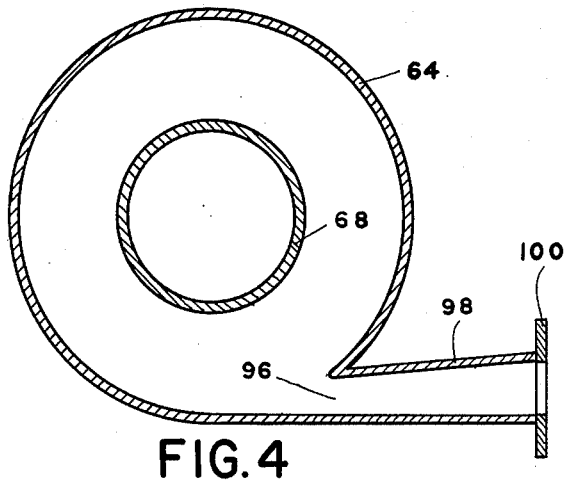
FIG. 4 is a transverse sectional view taken along the line 4—4 of FIG. 1.

The venturi scrubber is shown in greater detail in FIGS. 2 and 3. The venturi scrubber 14 has an entrance region 46 provided with a top flange 48 for connection to the duct 12 and a lower flange 50 which is connected to the outer housing of the venturi region 52, the outer housing having an upper flange 53 which mates with the flange 50, a suitable gasket 51 being provided between the mating faces of the flanges. Located within the venturi housing 52 is an upper collar of the venturi 54 open at its upper end and connected at its lower end to a converging region 56. The converging region 56, in turn, is connected at its lower end to the venturi throat 58. The outer housing 52 of the venturi also has a lower flange 60 which is connected to the top flange 62 of the collecting chamber 60, a suitable gasket 61 being provided between the mating faces of these flanges. Located within the outer wall 64 of the collecting region 16 is a diverging region 66 which, at its lower end, terminates in a downwardly opening cylindrical portion 68. The collar 54, converging region 56, throat 58, and diverging region 66 are co-axially aligned.

Affixed to the upper collar 54 of the venturi throat assembly is a sleeve 70 which is connected to the collar by bolts 72 passing through elongated slots 74, the arrangement permitting the sleeve 70 to be adjustably positioned to the collar 54. The throat region 58 of the venturi is also provided with an outer sleeve 82, the sleeve being carried by brackets 84 which are bolted to fixed brackets 86 by bolts 88, the arrangement again permitting the sleeve 82 to be moved relative to the throat region 58. As will be noted clearly from FIGS. 2 and 3, an annular opening is provided between the upper end of the collar 70 and the lower end of the entrance region 46. This opening 90 permits a portion of the gas stream to pass outwardly around the collar 70 and along the outside of the throat portion 58 of the venturi. A second opening 94 is provided at the lower end of the throat region so that the gases passing through the annular chamber 92 again enter the main gas stream as it passes into the diverging region 66. This arrangement results in a substantial increase in the turbulence within the diverging region 66 and, as a result, a more efficient mixing of the liquid injected into the gas stream so that a substantially higher surface area of liquid is presented for contact with the particulate material carried in the gas stream. As a result, a substantial increase in scrubbing action is obtained and a larger quantity of particulate material is removed from the gas stream without any increase in the power comsumption of the scrubber. The collars 70 and 82 permit the effective areas of the openings 90 and 94 to be adjusted so that the proportion of gas passing thorugh the venturi throat to that passing through the annular region 92 may be controlled to achieve the most efficient scrubbing action. It is contemplated that only one of the two collars 70 or 94 may be adjusted.

It should be noted that the diameter of the venturi housing 52 is not necessarily the same as that of the entrance region 46. Preferably, the diameter of the region 52 is greater than that of the entrance region 46. Also, the diameter of the collar 54 may be varied, the cross-sectional area of the collar 54 ranging from −50% to + 100% of the cross-sectional area of the entrance region 46. The particular diameters and opening sizes will vary in accordance with the particular installation in which the scrubber assembly is being used. It should also be noted that while reference is made to diameters implying that ducts and passages of circular cross-section are employed, the invention is not limited to such arrangements. Rather, ducts of rectangular or other cross sections may be used, again depending on a particular installation.

Referring to FIGS. 5–6, a modification of my invention will now be described. The venturi scrubber, designated generally by the reference numeral 110, has an entrance region 112 which receives gas from a flue or other duct. Downstream of the entrance region 112 is a converging region 114 which leads to a venturi throat 116. Below the throat 116 the walls of the scrubber 110 diverge in a diverging region 118. From the scrubber 110 gases are directed through a suitable sump 120 to a flue 122. A nozzle assembly 124 is provided in the converging region 114 of the scrubber to inject water or other liquid into the stream of gas passing into the throat 116.

In order to increase the operating efficiency of the scrubber I provide an annular passage 119 extending from the upper end of the converging region 114 downwardly to a passage 128 leading into the lower end of the throat region 116 or the upper end of the diverging region 118. The opening 130 of the passage 128 is an annular opening extending fully around the lower end of the throat region 116. Vanes 132 hinged to the outer wall 134 of the scrubber 110 are provided at the upper end of the passage 126 and those vanes may be controlled by any suitable mechanism, not shown, to move the vanes between an opened position, shown in dotted outline, in which all of the incoming gases are directed through the converging region 114 and the throat 116 and closed position, shown in solid outline in which a portion of the gases are directed downwardly through the ducts 126 and 128 while the main portion of the gas is directed through the converging region 114 and the throat 116. It should be noted that other arrangements such as flaps or valves in the ducts 126 or 128 may be used to control flow of gas through the ducts. The vanes 132 are preferred, however, as they provide a smooth transition from the entry region 112 to the converging region 114 when closed and thus do not produce unwanted turbulence in the incoming gas stream.

At an annular opening 130 the mainstream of gas passing through the throat 116 encounters the secondary gas stream which has passed through the passages 126 and 128. As a result, there is increased turbulence in the gas stream resulting in more complete mixing of the gas with the water injected through the nozzle 124. As was pointed out above, the increased turbulence results in greater contact between the particulate matter in the gas stream and the droplets of the liquor and, hence, a more efficient scrubbing action.

The gas passing out of the diverging region 118 into the sump 120 is substantially free of pollutants, the polluting matter being retained in the liquid which collects in the lower end of the sump 120 and which may be subsequently removed for processing or disposal.

In order to achieve proper action of the venturi scrubber the converging walls of the region 114 should be at an angle of approximately 20° to 45° from the vertical while the walls of the diverging region 118 are approximately at an angle of between 7° to 20° from the vertical. The secondary gas stream is injected into the primary stream on an axis 136 which is less than 90° from the vertical. As was pointed out above, the opening 130 through which a secondary stream passes may be located either in the venturi region 116 or in the adjacent upper portion of the diverging region 118 of the scrubber 110.

If desired, additional nozzles 140 and 142 may be provided for injecting water into the secondary gas stream passing through the annular passage 126 and into the primary gas stream as it passes through the venturi region 116. The number and precise location of these auxiliary nozzles will depend on the particular installation and the particular gases being cleaned.

A third embodiment of the invention is illustrated in FIG. 8. In this embodiment the venturi scrubber 144 has an entrance region 146, a converging region 148, a throat portion 150, and a diverging portion 152. A nozzle 154 is provided at the upper end of the converging region 148 for injecting water or other liquid into the incoming gas stream. A series of ducts 156 lead into the lower end of the throat 150 or the upper end of the diverging region 152, the ducts 156 terminating in openings 158. In this embodiment the entire incoming gas stream is directed through the throat portion 150, air from an auxiliary source, such as the blower 157, being injected through the ducts 156 and openings 158 to create additional turbulence promoting the scrubbing action within the diverging region 152.

The scrubber 160 illustrated at FIG. 9 again has an entrance region 162, a converging region 164, a throat region 166, and a diverging region 168. A nozzle 170 injects liquid into the gas stream as it passes through the scrubber. A plurality of ducts 172 leading from openings 174 in the converging region 164 to openings 176 in the region adjacent the junction between the throat 166 and the diverging region 168 are provided for directing a portion of the gas stream around the throat for subsequent injection into the gas stream to promote the desired turbulent action. It should be noted that the number of ducts 172 are not limited to those illustrated. A greater or lesser number of ducts may be provided.

In each of the embodiments illustrated the essential feature is in the injection of a secondary gas stream into the primary gas stream as it passes through the throat and diverging regions. By injecting the secondary stream at a point in which the primary stream is of increased velocity and decreased pressure, the more thorough mixing of the gas and injected liquid is achieved. This produces a more efficient scrubbing operation with a lower power consumption.

While only the best known embodiments of the invention have been illustrated and described in detail herein, it will be understood that the invention is not limited thereto or thereby but that various changes and additions may be made. Reference should thus be had to the appended claims in determining the true scope of the invention.

What is claimed is:

1. In a venturi scrubber having a first region for receiving a primary stream of gas, a second region extending from the downstream end of the first region and converging in the downstream direction, a third region of reduced diameter extending in a smooth inner surface configuration at the downstream end of the second region and forming the venturi throat, and a fourth region extending in a smooth inner surface configuration from the downstream end of the third region and diverging in the downstream direction, means to inject liquid in droplet form into the primary stream of gas, the improvement which comprises:
   at least one first duct opening into the scrubber at a point located within a first zone encompassing the downstream portion of the third region and the upstream portion of the fourth region; and
   means for directing a secondary stream of gas through the first duct into the first zone of the scrubber whereby the gas enters the first zone at an acute angle to the primary stream of gas so as to cause a substantial increase in turbulence within the primary stream of gas and a resultant increase in the surface area of the liquid droplets in said stream.

2. The improvement according to claim 1 wherein the means for directing a secondary stream of gas comprises at least one second duct extending from the first duct and opening into the scrubber at a point within a second zone encompassing the first region and the upstream portion of the converging region of the scrubber whereby a portion of the primary gas stream is diverted into the second duct to form the secondary gas stream.

3. The improvement according to claim 2 further including valving means to controllably close the ducts.

4. The improvement according to claim 2 wherein the opening between the first duct and the first zone is an annular opening extending continuously around the first zone.

5. The improvement according to claim 4 wherein the first duct is of annular cross section and surrounds the venturi throat, the first duct opening into the throat region in a continuous annular opening.

6. The improvement according to claim 5 further including a plurality of vanes attached to the walls of the scrubber at the opening between the first duct and the converging region, the vanes being movable between a first position covering the opening and forming a smooth transition between the entrance and converging regions and a second position in which the opening is uncovered.

7. The improvement according to claim 5 which includes means to vary the size of the annular opening between the first duct and the first zone.

8. The improvement according to claim 5 which includes means to vary the size of the annular opening between the first duct and the converging region.

9. A venturi scrubber, comprising:
   first wall means defining an inlet region;
   second wall means extending from the downstream end of the first wall means and converging in the downstream direction;
   third wall means extending in a smooth inner path configuration from the downstream end of the second wall means and defining the throat of the venturi;
   fourth wall means extending from the downstream end of the third wall means and diverging in the downstream direction;
   at least one duct opening into the venturi at a point within a zone extending between the downstream portion of the throat and the upstream portion of the fourth wall means to inject a secondary stream of gas into the primary gas stream through the scrubber, the secondary stream being injected at an acute angle to the primary gas stream; said duct extending from the opening within the zone to a second opening in the second wall means wherein the openings at each end of the duct are annular openings extending substantially the full circumference of the scrubber and the duct surrounds the wall means between the two openings; and
   nozzle means for injecting a liquid into the stream of gas passing through the venturi throat.

10. The venturi scrubber according to claim 9 wherein there are a plurality of ducts, the openings of the ducts in the first zone and those in the second wall means each being arranged in a circle around the wall means.

11. The venturi scrubber according to claim 9 further including valve means to control gas flow through the duct.

12. The venturi scrubber according to claim 9 further including means for forcing the secondary gas stream through the duct from a source external to the scrubber.

13. The venturi scrubber according to claim 9 further including additional nozzle means for injecting liquid in droplet form into the secondary gas stream passing through the duct.

14. The venturi scrubber according to claim 9 wherein the duct surrounds the second and third wall means, a continuous gap being provided between the first and second wall means to provide an upper opening into the duct, and a continuous gap being provided between the third and fourth wall means to provide a lower opening into the duct.

15. The venturi scrubber according to claim 14 further including means to vary the size of the lower opening into the duct.

16. The venturi scrubber according to claim 14 further including means to vary the size of the upper opening into the duct.

17. The venturi scrubber according to claim 16 wherein the means to vary the size of the opening comprises a sleeve telescopingly received on the upper end of the second wall means.

* * * * *